HIGH SPEED SAMPLE AND HOLD CIRCUIT

Filed Feb. 13, 1967 4 Sheets-Sheet 1

INVENTOR
R. E. FISHER
BY
[signature]
ATTORNEY

HIGH SPEED SAMPLE AND HOLD CIRCUIT

Filed Feb. 13, 1967 4 Sheets-Sheet 2

HIGH SPEED SAMPLE AND HOLD CIRCUIT

Filed Feb. 13, 1967 4 Sheets-Sheet 4

3,479,528

HIGH SPEED SAMPLE AND HOLD CIRCUIT

Reed E. Fisher, Parsippany-Troy Hills Township, Morris County, N.J., assignor to Bell Telephone Laboratories, Incorporated, Murray Hill and Berkeley Heights, N.J., a corporation of New York Filed Feb. 13, 1967, Ser. No. 615,702
Int. Cl. H03k 5/20
U.S. Cl. 307—231 7 Claims

ABSTRACT OF THE DISCLOSURE

An analog signal is transmitted on first and second parallel paths. A positive D-C voltage and negative pulses are added in series to the signal on the first path; a negative D-C voltage and positive pulses are added in series to the signal on the second path. When the negative pulses extend below a threshold, a diode in the first path is forward-biased and a sample is taken and held by a capacitor; when the positive pulses extend above the threshold, a diode in the second path is forward-biased and another sample is held by the capacitor.

Background of the invention

Certain communications systems, such as those employing pulse code modulation, require components known as sample and hold circuits for deriving a staircase-shaped waveform having discrete voltage amplitude levels that represent the approximate average amplitude of an input analog signal during discrete time intervals. Ordinarily this is done by applying the signal to a gate that is periodically actuated by short pulses. When the gate is actuated, a storage capacitor is charged to the voltage of the instantaneous amplitude of the signal and this voltage is maintained during the time interval between recurring pulses, or hold period.

As shown, for example, in the paper, "A Precision Sample and Hold Circuit with Subnanosecond Switching," IEEE Transactions on Circuit Theory, September 1964, pp. 389–396, and the copending application of I. Dostis, Ser. No. 466,364, filed June 23, 1965, and assigned to Bell Telephone Laboratories, Incorporated, very high frequency sample and hold circuits usually use a diode bridge as the gate with the pulses being applied in parallel with the signal. The pulse source is isolated from the signal by a resistance or a diode arrangement either of which tends to increase the charging time of the storage capacitor. This in turn limits the sampling frequency at which the circuit can be operated.

Summary of the invention

It is an object of this invention to provide a sample and hold circuit which is capable of operating at very high sampling frequencies.

This and other objects of the invention are attained in an illustrative embodiment thereof comprising a sample and hold circuit in which an input signal is transmitted on first and second parallel paths. A positive D-C voltage and negative pulses are added in series to the signal on the first path; a negative D-C voltage and positive pulses are added in series to the signal on the second path. A diode in the first path is normally reverse-biased by the positive D-C voltage while a diode in the second path is normally reverse-biased by the negative D-C voltage. However, when the analog signal has a positive value, the positive pulses forward-bias the diode in the second path to charge a storage capacitor. Likewise, when the input signal has a negative voltage, the negative pulses forward-bias the diode in the first path to charge the storage capacitor to a new value. During the interval between recurring pulses, the storage capacitor holds the stored voltage as in conventional circuits. To the best of my knowledge, pulse voltages for actuating diodes have not heretofore been added to the signal prior to signal transmission to a gating diode. The pulse generator is effectively connected in series with the input signal source and, as such, the problems associated with parallel connection of the pulse source are avoided.

The brief description of the circuit given above implies that only one of the diodes is forward-biased by the recurring pulses depending upon whether the input voltage is at a positive or negative value. In practice, however, for optimum efficiency and fastest charging of the storage capacitor, both of the diodes should be forward-biased during each sampling period. As will be described more fully later, this can be accomplished by making the magnitude of each of the voltage pulses greater than the D-C bias of their respective paths plus the maximum peak-to-peak voltage amplitude of the signal on the respective paths. To prevent forward-biasing of the diodes during the hold period, the magnitude of the D-C bias on each of the paths should be greater than the maximum peak-to-peak voltage of the signal on those paths.

I have found that a balanced to unbalanced transformer, or balun, is admirably suited for the purpose of deriving equal positive and negative pulses from a pulse source and adding them to the signal waves on the two paths as described before. By using two of the coils of the balun as part of the two transmission paths and connecting a third coil to a source of positive pulses, positive and negative pulses will be added to the signal waves on the two paths as is required for the invention. The balun is advantageously located a half wavelength at the pulse frequency from the diodes of the two paths so that any pulse energy reflected from the diodes will add in phase with the pulses at the balun.

Drawing description

These and other objects, features, and advantages of the invention will be better understood from the consideration of the following detailed description taken in conjunction with the accompanying drawing in which.

Detailed description

Figure 1:
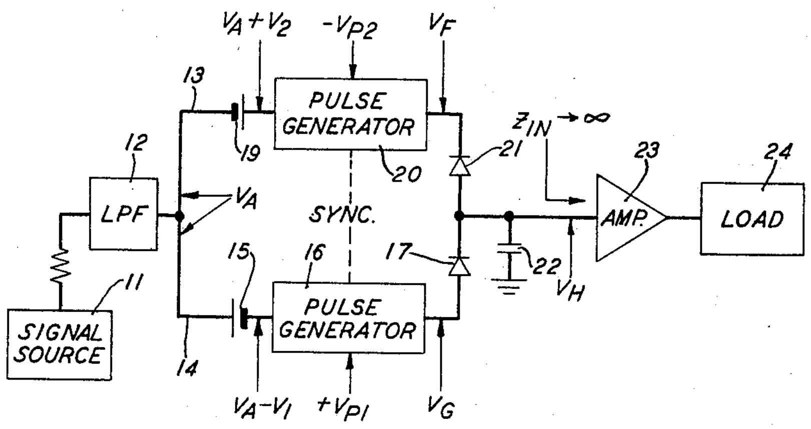
FIG. 1 is a functional diagram of a sample-and-hold circuit in accordance with one embodiment of the invention.

Referring now to FIG. 1, there is shown a functional diagram of a sample and hold circuit the purpose of which is to derive a staircase waveform from an analog signal generated by a signal source 11. The signal proceeds through a low pass filter 12 where it is reduced to a band limited voltage $V_A$, shown in FIG. 2A, which is impressed on two parallel paths 13 and 14. A battery 15, a pulse generator 16, and a gate diode 17 are connected in series in the lower path 14 with a battery 19, a pulse generator 20, and a gate diode 21 being connected in series in the upper path 13. The outputs of the pulse generators 16 and 20 are in synchronism as indicated in the figure. The outputs of the gate diodes are connected to a storage capacitor 22 and a high input impedance amplifier 23 which in turn is connected to a load 24. Typical waveforms of voltages at various locations in the circuit are shown respectively in FIGS. 2A through 2H.

Figures 2A, 2B, 2C, 2D, 2E, 2F, 2G, 2H, 4:
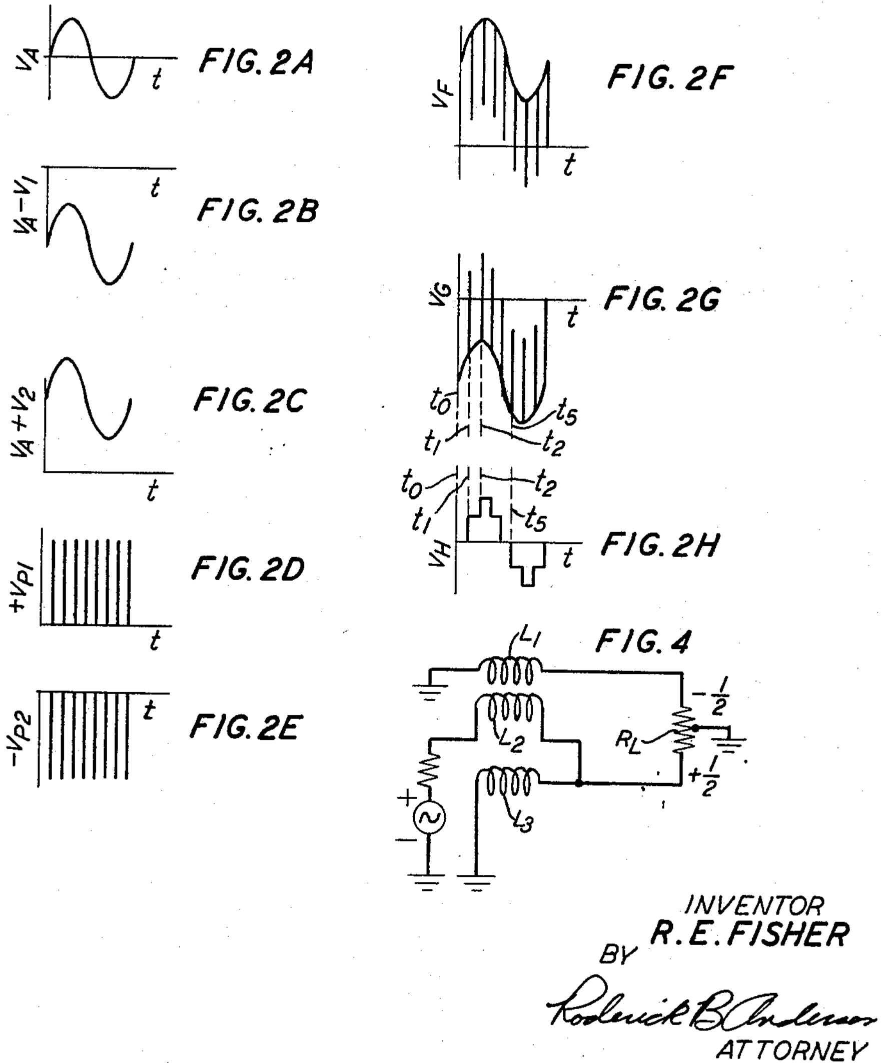
FIGS. 2A through 2H are representations of waveforms at various locations in the circuit of FIG. 1.
FIG. 4 is a schematic diagram of a balanced to unbalanced transformer of the prior art.

Proceeding along path 14, the battery 15 adds to the signal voltage $V_A$ a negative D-C bias $-V_1$ which yields a waveform $V_A - V_1$ shown in FIG. 2B. The pulse generator 16 generates positive pulses $+V_{p1}$ shown in FIG. 2D which are added to the signal on path 14 to yield the voltage $V_G$ shown in FIG. 2G. $V_G$ is, of course, the sum of the analog voltage, the D-C bias, and the positive pulses or, $$V_G = V_A - V_1 + V_{p1} \quad (1)$$

Proceeding along the upper path 13, the battery 19 adds a positive D-C bias $+V_2$ yielding the waveform $V_A + V_2$ shown in FIG. 2C. The pulse generator 20 supplies negative pulses $-V_{p2}$ as shown in FIG. 2E which, when added to the bias signal, yield the voltage $V_F$ shown in FIG. 2F, where $$V_F = V_A + V_2 - V_{p2} \quad (2)$$

For purpose of illustration, the magnitude of the voltage pulses, $V_{p1}$ and $V_{p2}$, have been shown as being equal to the magnitude of the bias voltages $V_1$ and $V_2$. Hence, in FIG. 2G the voltage $V_G$ is shown as being positive only at those phase positions corresponding with a positive value of the signal wave $V_A$ shown in FIG. 2A. Likewise in FIG. 2F, the voltage $V_F$ is negative only at phase positions corresponding to a negative value of $V_A$. As will be described later, this condition is not essential or even optimum for operation of the circuit, but it is useful for understanding the principles of operation.

The diodes 17 and 21 are normally reverse-biased by the batteries 15 and 19 and are therefore normally nonconducting. However, when the voltage $V_F$ is negative due to a negatively extending pulse, the diode 21 becomes conducting; likewise, the diode 17 is conductive in response to a positive voltage $V_G$. The storage capacitor 22 holds the voltage transmitted through the diodes for the time interval between successive pulses, or hold period.

Referring to FIG. 2H, which shows the storage capacitor hold voltage $V_H$, assume that at time $t_0$ the voltage on the capacitor 22 is zero. At time $t_1$, the pulse component of voltage $V_G$ of FIG. 2G is positive, causing diode 17 to conduct thereby raising the voltage $V_H$ to the instantaneous value of $V_G$ as shown in FIG. 2H. During the hold period between successive pulses, neither diode is forward-biased and $V_H$ is substantially constant due to the high input impedance of amplifier 23. At time $t_2$ a higher positive voltage pulse is conducted through the forward-biased diode 17 again raising the amplitude of $V_H$. At $t_5$ the voltage $V_G$ of FIG. 2G is negative and so diode 17 does not conduct, but the negative voltage $V_F$ of FIG. 2F forward-biases diode 21 driving $V_H$ to a negative value. Similar comparisons of FIG. 2H with FIGS. 2F and 2G show that the various steps of voltage $V_H$ represents the approximate average amplitude of the signal $V_A$ at successive time intervals.

From the foregoing, it can be seen that the batteries 15 and 19 of FIG. 1 are required for back-biasing the diodes 17 and 21 so that they will conduct only in response to the pulse components. Accordingly, the magnitudes of the D-C bias components should be greater than the magnitude of the maximum peak-to-peak signal voltage so that neither of the diodes 17 or 21 is forward-biased during the interval between pulses, or $$|V_1| > |\hat{V}_{AP}| \quad (3)$$

$$|V_2| > |\hat{V}_{AP}| \quad (4)$$

where $\hat{V}_{AP}$ is the maximum peak-to-peak voltage of the signal wave. For the pulses to forward-bias the diodes 17 and 21, the magnitudes of the pulse components must be at least equal to the D-C bias components or $$|V_{p1}| \geq |V_1| \quad (5)$$

$$|V_{p2}| \geq |V_2| \quad (6)$$

Figures 3, 5:
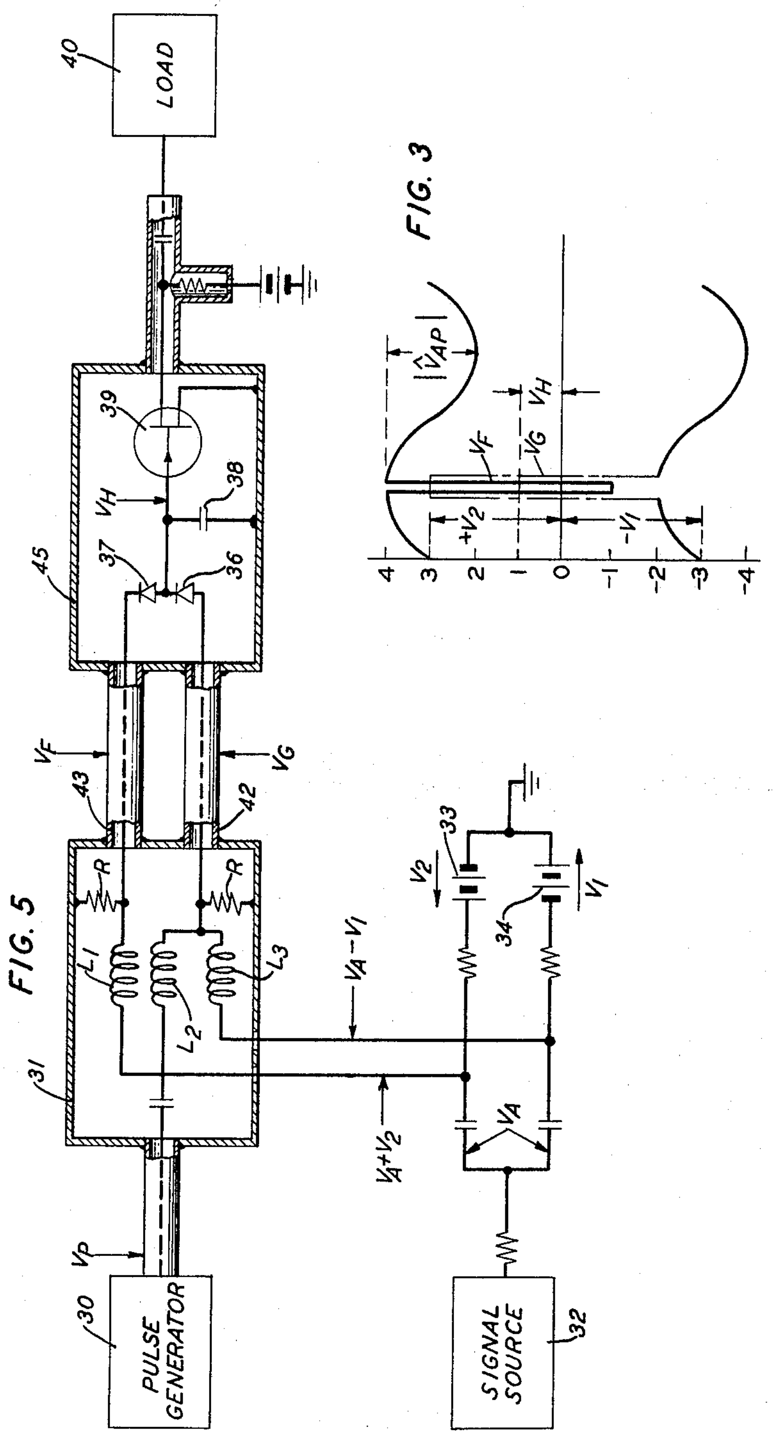
FIG. 3 is a representation of waveforms that may occur in the circuit of FIG. 1.
FIG. 5 is a schematic diagram of the circuit of FIG. 1 incorporating a balanced to unbalanced transformer.

As described thus far, only one of the diodes is actuated during each of the sample periods. If both of the diodes are actuated during each sample period, the storage capacitor 22 will charge faster and the circuit will be capable of higher sampling rates. Appropriate excursions of voltages $V_F$ and $V_G$ for doing this are illustrated in FIG. 3 in which the voltages are superimposed on a single graph for purposes of comparison. Notice that during the sampling period shown, the two pulse voltages overlap thereby triggering both of the diodes 17 and 21. However, the voltage $V_H$ held during the hold period by storage capacitor 22 will be the average of the two voltages $V_F$ and $V_G$. Notice that the average voltage $V_H$ does not change regardless of the extent of overlap of $V_F$ and $V_G$. The two pulse components are shown to be of different duration only for clarity of exposition; in practice they are preferably of the same duration.

In order for both diodes to be triggered during each sampling period, the magnitudes of the pulse voltages should be high enough so that during each sampling period $V_F$ is negative and $V_G$ is positive. These criteria can be stated by the relations $$|V_{p1}| > |V_1| + |\hat{V}_{AP}| \quad (7)$$

$$|V_{p2}| > |V_2| + |\hat{V}_{AP}| \quad (8)$$

Relationships 8 and 9 state that the magnitude of the pulses is greater than the magnitude of the bias voltage plus the maximum peak-to-peak voltage of the signal as is required for insuring that both diodes are forward-biased regardless of the amplitude of the signal.

I have found that a balanced to unbalanced transformer, known as a balun, can conveniently be used to perform the function of adding the pulse voltages in series as shown by the functional diagram of FIG. 1. The balun is described in detail in the paper, "Some Broad-Band Transformers," by C. L. Ruthroff, Proceedings of the IRE, August 1959, pp. 1337–1342, while FIG. 4 summarizes its function. $L_1$ and $L_2$ are bifilar coils which form the balun. $L_3$ is an additional coil wound on the same core. If a positive voltage is applied to the coil $L_3$ as shown, a positive voltage having half the magnitude of the original voltage will appear on one side of the resistor $R_L$ and a negative voltage having half the magnitude of the applied voltage will appear on the opposite side of the resistor.

This principle is used in the sample and hold circuit of FIG. 5 which comprises a pulse generator 30 connected to a balun 31 having coils $L_1$ and $L_3$ which are connected to an input signal source 32. A positive D-C bias is applied by battery 33 to the signal transmitted to coil $L_1$ while a negative D-C bias from a battery 34 is supplied to coil $L_3$. The outputs of the balun are connected by lines 42 and 43 to diodes 36 and 37 which in turn are connected to a storage capacitor 38 and a field effect transistor (FET) 39. The output of the FET is connected to a load 40. The voltages shown correspond to the illustrative waveforms of FIGS. 2A through 2H.

The pulse generator 30 produces positive pulses $V_p$ of approximately twice the magnitude of the positive and negative pulses $V_{p1}$ and $V_{p2}$ to be applied to the two signal paths. The balun 31 then splits the pulses between the coil $L_1$ connected to transmission line 43 and coil $L_3$ connected to transmission line 42. The positive voltage pulses are then manifested at line 43 as negatively extending pulses while the pulses supplied to line 42 are positively extending, the magnitudes of all the pulses being half the magnitude of the originally applied pulses. It can be appreciated that the circuit of FIG. 5 performs the functions illustrated in FIG. 1 through the use of a single pulse generator.

Figure 6:
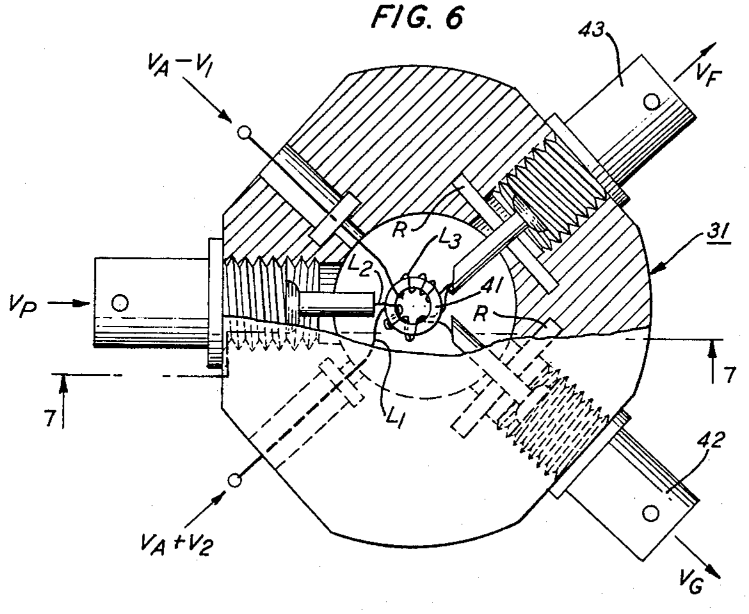
FIG. 6 is a partially sectional view of a balanced to unbalanced transformer that may be used in the circuit of FIG. 5.
Figure 7:
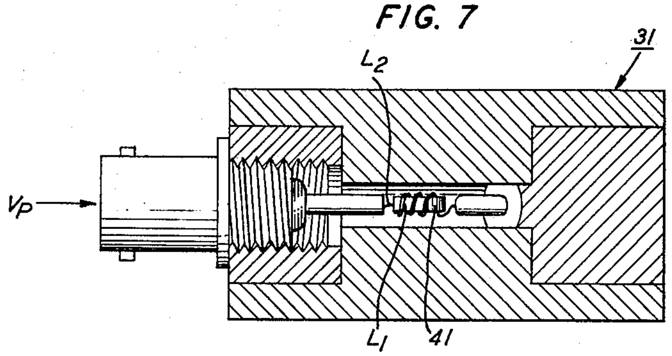
FIG. 7 is a view taken along lines 7—7 of FIG. 6.

The circuit of FIG. 5 has been built and successfully tested using components that will now be described, although it is to be understood that alternative components could be used. The pulse generaor 30 is a "snap diode" pulser using a charge storage varactor diode driven by a 120 megahertz 1 watt sine wave source to achieve very fast rise pulses at a 120 megahertz repetition rate. An example of a pulse generator of this type is described in the paper, "Microwave Harmonic Generation and Nanosecond Pulse Generation With the Step-Recovery Diode," Hewlett-Packard Journal, vol. 6, No. 4, December 1964, pp. 1–3. The pulse generator is connected to the balun 31 by an RG–58 CU coaxial cable. The coils $L_1$, $L_2$, and $L_3$ of the balun are wound on a ferrite toroidal core 41, shown in FIGS. 6 and 7. Disk resistors R having resistances of 50 ohms are used to provide impedance matching with the coaxial transmission lines 42 and 43 which have 50 ohm characteristic impedances.

Figure 8:
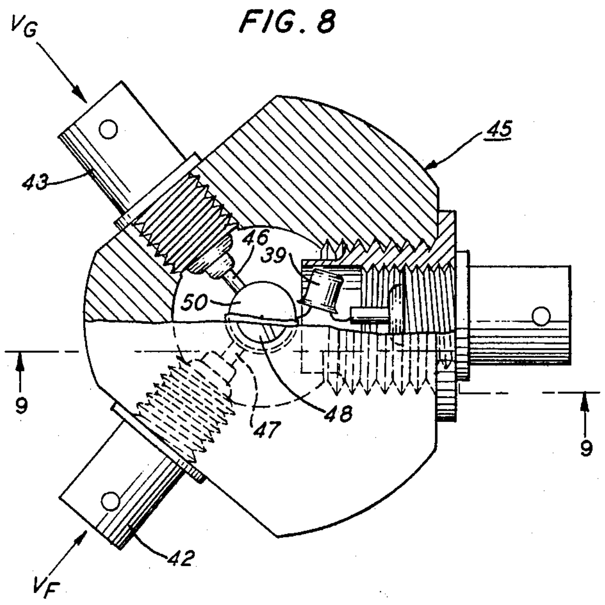
FIG. 8 is a partially sectional view of a diode gate and hold circuit that may be used in the circuit of FIG. 5.
Figure 9:
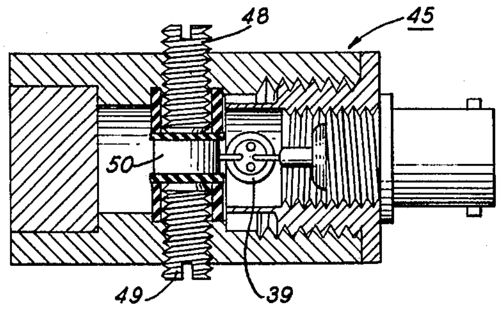
FIG. 9 is a view taken along lines 9—9 of FIG. 8.

The diodes and the field effect transistor are contained within an enclosure 45 shown in FIGS. 8 and 9. The diodes 36 and 37 are gallium arsenide Schottky barrier diodes contained within packages 46 and 47. The capacitor 38 of FIG. 5 is formed from two tuning screws 48 and 49 in proximity to a cylindrical brass block 50 which serves as a common junction for the two diodes and is connected to the field effect transistor 39. The transistor 39 is an N-channel insulated gate MOS depletion mode silicon field effect transistor in a TO–18 package.

The coaxial lines 42 and 43 interconnecting the balun 31 and the diode gate and capacitor enclosure 45 each advantageously provide an electrical delay equal to a half period at the pulse frequency. As a result, any pulse energy reflected from the diodes back to the balun will be delayed for a time equal to one period and will therefore add in phase with the pulse components at the balun. Similarly, the coaxial cable interconnecting pulse generator 30 and balun 31 is made approximately a half wavelength long.

In summary, my invention has been discussed with reference to the functional diagram of FIG. 1 which illustrates the principles of the invention and shows how higher speed sampling can be attained. The specific embodiment of FIGS. 5 through 9 is a microwave circuit capable of sampling a broad band input signal of from .5 to 60 megahertz at a 120 megahertz repetition rate. Those skilled in the art will appreciate that design refinements can be made which will raise the sampling frequency and will allow an even broader analog base bandwidth to be used. Moreover, it is also clear that my invention may be used only for high speed sampling without including the voltage holding elements. Various other modifications and embodiments may be made by those skilled in the art without departing from the spirit and scope of the invention.

What is claimed is:

1. A sampling circuit comprising:

means for transmitting first and second replicas of an incoming analog signal on first and second paths, respectively;

means for adding a positive D-C voltage component to the first replica;

means for adding a negative D-C voltage component to the second replica;

means for adding repetitive negative voltage pulses to the first replica;

means for adding synchronized repetitive positive voltage pulses to the second replica;

a first diode in the first path being reverse-biased by the positive D-C component;

a second diode in the second path being reverse-biased by the negative D-C component; and oppositely poled terminals of said first and second diodes being connected to a common output path.

2. The sampling circuit of claim 1 wherein:

the magnitude of the negative voltage pulses is at least as large as the magnitude of the positive D-C voltage component;

the magnitude of the positive voltage pulses is at least as large as the magnitude of the negative D-C voltage component;

and further comprising a capacitor connected to the output path for holding the output path voltage at substantially a constant value during the time interval between repetitive pulses, whereby the sampling circuit constitutes a sample and hold circuit.

3. The sample and hold circuit of claim 2 wherein:

the magnitude of the positive voltage D-C component is greater than the maximum peak-to-peak voltage of the first replica;

and the magnitude of the negative voltage D-C component is greater than the maximum peak-to-peak voltage of the second replica.

4. The sample and hold circuit of claim 2 wherein:

the means for adding positive pulses and the means for adding negative pulses comprises a balanced to unbalanced transformer connected to the first and second paths.

5. The sample and hold circuit of claim 3 wherein:

the magnitude of the negative voltage pulses is greater than the sum of magnitudes of the positive voltage component and the maximum peak-to-peak voltage of the first replica;

and the magnitude of the positive voltage pulses is greater than the sum of the magnitudes of the negative voltage component and the maximum peak-to-peak voltage of the second component.

6. The sample and hold circuit of claim 4 wherein:

the transformer comprises first, second, and third coils each having input and output ends;

the positive D-C voltage adding means is connected to the input end of the first coil;

the negative D-C voltage adding means is connected to the input end of the third coil;

a pulse generating device is connected to the input end of the second coil;

the first diode is connected to the output end of the first coil;

and the second diode is connected to the output ends of the second and third coils.

7. The sample and hold circuit of claim 6 wherein:

the repetitive pulses are periodic;

and the first and second diodes are connected to the transformer by transmission lines each having an electrical delay substantially equal to half the period of the periodic pulses.

References Cited

UNITED STATES PATENTS 3,241,076 3/1966 Magleby et al. _______ 328—151

DONALD D. FORRER, Primary Examiner

B. P. DAVIS, Assistant Examiner

U.S. Cl. X.R.

307—227, 238; 328—121, 151